3,803,152
PROCESS FOR THE PREPARATION OF 3,5-DIMETHYLPYRIDINE

Helmut Reiff, Cologne, Dieter Dieterich, Leverkusen, and Heinz Ziemann, Leichlingen, Germany, assignors to Bayer Aktiengesellschaft, Leverkusen, Germany
No Drawing. Filed Sept. 13, 1971, Ser. No. 180,152
Claims priority, application Germany, Sept. 17, 1970, P 20 45 880.4
Int. Cl. C07d *31/06*
U.S. Cl. 260—290 P  10 Claims

ABSTRACT OF THE DISCLOSURE 3,5-dimethylpyridine is prepared by reacting 2-methylenepropane-1,3-diol, or its esters with ammonia, methylamine or dimethylamine.

BACKGROUND

Many synthetic methods for the preparation of 3,5-dimethylpyridine are known. However they all result in mixtures of pyridine derivatives.

A process for the preparation of 3,5-dimethylpyridine from 1,1,1-trimethylolethane has been described in Belgian patent specification No. 738,034. This process provides high yields and the compound obtained after distillation of the product twice is 98% pure.

The process has, however, the disadvantage of requiring the use of high temperatures and acid catalysts, which gives rise to serious corrosion problems. Thus, in order to obtain optimum yields, it is necessary to employ temperatures of over 270° C., strong mineral acids as catalysts and methanol as solvent. Autoclaves made of refined steel or titanium are severely attacked under these conditions.

SUMMARY

A new process for the preparation of 3,5-dimethylpyridine has now been found, which consists in reacting 2-methylenepropane-1,3-diol, if desired in the form of its esters, with ammonia and/or amines. This reaction, which has previously been unknown, is very surprising to the expert.

Even at temperatures below 270° C., this process provides higher yields than the process mentioned above, but more importantly, 3,5-dimethylpyridine is obtained with a degree of purity of over 85% to 95% after only a simple steam distillation and can be used for subsequent reactions without further purification, e.g. for the preparation of dicarboxylic acids by oxidation.

This invention thus relates to a process for the preparation of 3,5-dimethylpyridine, which is characterized in that 2-methylenepropane-1,3-diol and/or its mono or diesters are reacted at temperatures in the range of 180° C. to 600° C. with at least half the equimolar quantity of a compound of the formula

wherein R may represent H and up to 2 of the radicals R may represent methyl, or mixtures of such compounds.

DESCRIPTION

It may sometimes be advantageous to carry out the process in the presence of a polar solvent and with the addition of acid catalysts and at elevated pressure.

The mono- or di-esters of 2-methylene-propane-1,3-diol may be monoesters or diesters of this compound with aliphatic carboxylic acids (preferably containing 1 to 6 carbon atoms), aromatic carboxylic acids (preferably benzoic acid and derivatives thereof) or hydroaromatic carboxylic acids (for example hexahydrobenzoic acid and its derivatives). Corresponding sulphonate esters may also be used. Acetates, propionates, butyrates, benzoates, methylates and tosylates are given as examples of such monoesters and diesters. 2-methylene-propane-1,3-diol may, of course, also be used in the form of its cyclic carbonate, sulphite and sulphate but it is particularly advantageous to use the diacetate and even more advantageous to use 2-methylene propane-1,3-diol itself. It may well be used in the form of a commercial crude product which may have been prepared e.g. by alcoholysis of the diacetate and still contain 1 to 30% of the monoacetate and/or diacetate. Commercial crude products or first fractions which contain up to 40% of methacrolein either in the free form or bound in the form of the (semi) acetal in addition to 2-methylenepropane-1,3-diol are also very suitable.

Amines which are particularly suitable for the reaction are methylamine and dimethylamine but the reaction is preferably carried out with ammonia. The quantity of amine or ammonia used is generally 0.5 to 10 (preferably 0.8 to 5) mol per mol of methylene-propanediol (ester). One may, of course, use any mixtures of the above mentioned nitrogen compounds $(R)_3N$. The reaction may, if desired, be carried out under pressure on account of the volatility of these nitrogen compounds. The reaction time amounts to between about 0.1 and 20 hours (preferably 3 to 12 hours), depending on the other reaction conditions. The reaction times required naturally decrease with increasing reaction temperatures. The reactants may be added in any sequence.

If desired, the mixture of reactants prepared at room temperature may be heated to the required temperature or alternatively the amine component may be introduced into the reaction vessel and methylene propanediol added thereto. If the process is carried out discontinuously, it is advantageous to introduce methylene propanediol into the reaction vessel, force the ammonia or amine in under pressure and then heat up the reaction mixture.

Since 3,5-dialkylpyridines are heat stable at temperatures of over 500° C., the process according to the invention may also advantageously be carried out continuously and even without pressure. For example, the reaction mixture may be introduced as a liquid or in gaseous form into a hot reactor, the time required for heating the reaction mixture to the reaction temperature thus being reduced to fractions of a second. The temperature employed is preferably in the region of about 300° C. to about 600° C. The process may be carried out e.g. by maintaining an atmosphere of ammonia, methylamine or dimethylamine in the reaction chamber and the feeding methylenepropanediol or its mono- or diesters or a mixture of these compounds into the reaction vessel. The residence time of the reactants in the reaction vessel may in this case be a few seconds to several minutes. The reaction products are condensed after leaving the reactor and unreacted ammonia or amine is cycled.

A particularly advantageous procedure is to carry out the process continuously under pressure in a tube reactor. For this procedure, the components are fed into a pressure tube by means of dosing pumps and the reaction to produce 3,5-dimethylpyridine takes place there in the liquid phase at temperatures of 200° C. to 320° C., preferably 240° C. to 300° C. The residence time can easily be adjusted to the desired range of about 1 to 12 hours by adjusting the volume of the tube and the rate of feed. The reaction product is discharged through a release valve. Excess ammonia or amine may be cycled as may also unreacted starting material or water-soluble intermediate products. The reaction may be carried out without catalyst but it is advantageous to use acid catalysts which have pK values of less than 6 (preferably less than 3.0).

Various mineral, sulphonic and/or carboxylic acid catalysts may be used, e.g. sulphuric acid, selenic acid, hydrochloric acid, hydrobromic acid, hydriodic acid, perchloric acid, arsenic acid, pyrophosphoric acid, ammonium chloride, benzenesulphonic acid, o-aminobenzene sulphonic acid, picric acid, naphthalene-sulphonic acid, o-nitrobenzoic acid, lactic acid, acetic acid, trichlorophenol, oxalic acid, succinic acid, phosphoric acid, phosphorous acid, methanesulphonic acid, ethanesulphonic acid, propanesulphonic acid, butanesulphonic acid and p-toluenesulphonic acid. The catalysts may, of course, also be used in the form of their ammonium or amine salts $(R)_3N$. They are generally used at concentration of 0.1 to 20% by weight of acid, based on the reactants.

The catalysts may be dissolved homogeneously in the reaction mixture or they may be adsorbed on carriers such as active charcoal or silica. Catalysts adsorbed on silica are used, for example, when the reaction is carried out in the gaseous phase. Catalytically active solid catalysts such as aluminium oxide, silicic acid or boron, phosphate may also be used, especially when the reaction is carried out in the gaseous phase. If the starting material contains enough esters of methylenepropanediol then the acid catalyst is formed in situ in the presence of water during the reaction.

Solvents may be used but they are not essential. Polar solvents such as alcohols, nitrobenzene, formamide or dimethylformamide and particularly water and methanol are preferred. Ammonia and low boiling amines are frequently used in the form of aqueous solutions. The quantity of solvent should not significantly exceed the quantity of reactants.

3,5-dimethylpyridine can be easily separated from the reaction products, e.g. by distillation or by extraction with non-polar solvents such as petroleum hydrocarbons, methylene chloride or toluene. Working up is preferably carried out by steam distillation at 100° C. to 160° C., if desired with superheated steam, followed by salting out the aqueous phase. By this method, 3,5-dimethylpyridine is obtained directly with a degree of purity of 85 to 95% and for most subsequent reactions it then requires no further purification. For example, the upper phase of the steam distillate may be directly oxidized to dinicotinic acid.

and as intermediate product for the synthesis of plant protective agents and dyes and for the preparation of preliminary products for the production of temperature resistant polymers.

3,5-dimethylpyridine is particularly important as a preliminary stage for the preparation of pyridine-3,5-dicarboxylic acid and its derivatives and for the preparation of 3,5-dimethylpiperidine.

EXAMPLE 1

352 g. (4 mol) of 2-methylenepropane-1,3-diol and 400 g. of a 25% aqueous ammonium chloride solution are introduced into a titanium autoclave which has been flushed out with nitrogen, the autoclave is sealed and 170 cc. of ammonia (6 mol) are forced in under pressure. The autoclave is heated to 250° C. (reaction pressure 50 to 55 excess atmospheres) and this temperature is maintained for 10 hours. After cooling, the diphasic reaction mixture is steam distilled. 112 g. (52.5% of the theory) of 3,5-dimethylpyridine are obtained after drying the organic phase over potassium hydroxide. Gas chromatographic analysis of the organic phase indicates 90% of 3,5-dimethylpyridine, 1% of 3,5-methylethylpyridine and 2% of 3-methyl pyridine.

EXAMPLE 2

102 g. of 3,5-dimethylpyridine are obtained by a method completely analogous to that of Example 1 from 688 g. (4 mol) of 2-methylenepropane-1,3-diol diacetate, 400 g. of a 25% aqueous ammonium chloride solution and 350 cc. of ammonia (12.4 mol). Gas chromatographic analysis of the organic phase indicates 88% of 3,5-dimethylpyridine, 0.5% of 3,5-methylethylpyridine and 2% of 3-methylpyridine.

EXAMPLES 3 TO 12

The table below shows the yields of 3,5-dimethylpyridine obtained and the gas chromatographic content of this product in the dried organic phase of the steam distillate when temperature, time, catalyst and autoclave material are varied. Example 9 is a control experiment carried out without catalyst.

Reaction mixture:
176 g (2 mol) of 2-methylpropane-1,3-diol,
150 g. of water,
85 cc. of ammonia (3 mol) and
catalyst as shown in the table.

| Example | Autoclave | Time (hr.) | Temperature (° C.) | Catalyst | 3,5-dimethyl pyridine (percent of theory) | Purity, percent |
|---|---|---|---|---|---|---|
| 3 | Titanium | 3 | 250 | NH₄Cl, 50 grams | 41 | 87 |
| 4 | do | 10 | 210 | do | 21 | 90 |
| 5 | Tantalum | 6 | 250 | do | 40 | 90 |
| 6 | Titanium | 10 | 250 | CH₃NH₂·XHCl, 50 grams | 58 | 84 |
| 7 | do | 3 | 250 | do | 30 | 84 |
| 8 | Refined steel | 6 | 250 | (NH₄)₂SO₄, 50 grams | 33 | 88 |
| 9 | do | 10 | 250 | | 10 | 62 |
| 10 | Tantalum | 10 | 250 | NH₄Cl, 25 grams | 32 | 79 |
| 11 | do | 10 | 240 | (CH₃NH₃)₂SO₄, 40 grams | 34 | 84 |
| 12 | do | 10 | 250 | CH₃NH₂XHCl, 50 grams | 41 | 78 |

It is particularly advantageous to carry out the present invention by reacting 2-methylene-propane-1,3-diol with ammonia at 200° C. to 300° C. at a pressure of 10 to 200 excess atmospheres, preferably 50 to 150 excess atmospheres.

This is preferably carried out simply by reacting a concentrated aqueous solution containing 2-methylene-propane-1,3-diol and 0.1 to 10% by weight of ammonium sulphate, ammonium phosphate, ammonium chloride, methylamine hydrochloride or ammonium acetate with ammonia.

3,5-dimethylpyridine is an extremely valuable technological product. It can be used as solvent, catalyst or co-catalyst, if desired in the form of metal complex salts, In Example 12 the reaction was carried out with 150 g. of methylamine instead of ammonia. The various types of refined steel (VA steel) which may be used as autoclave material are described in Holleman-Wiberg, Lehrbuch der anorganischen Chemie, 1952.

EXAMPLES 13 TO 21

Table 2 shows the yields of 3,5-dimethylpyridine when temperature, time, catalyst and autoclave material are varied. Example 13 is a control experiment carried out without catalyst.

Reaction mixture:
345 g. (2 mol) of 2-methylenepropane-1,3-diol diacetate, 200 g. of water,
185 cc. of ammonia (6.6 mol) and catalyst as shown in the table.

| Example | Autoclave | Time (hr.) | Temperature (° C.) | Catalyst | 3,5-dimethyl pyridine (percent of theory) | Purity, percent |
|---|---|---|---|---|---|---|
| 13 | Refined steel | 10 | 250 | | 1 | 88 |
| 14 | Tantalum | 10 | 230 | NH₄Cl, 50 grams | 30 | 86 |
| 15 | do | 12 | 250 | NH₄Cl, 25 grams | 35 | 84 |
| 16 | do | 12 | 250 | CH₃NH₂XCl, 50 grams | 45 | 83 |
| 17 | do | 10 | 250 | Methylamine sulphate, 40 grams | 34 | 78 |
| 18 | do | 10 | 250 | CH₃NH₂XCl, 50 grams | 38 | 61 |
| 19 | do | 10 | 280 | NH₄Cl, 80 grams | 39 | 84 |
| 20 | do | 10 | 280 | HClO₄, 35 grams | 31 | 74 |
| 21 | do | 12 | 250 | (NH₄)₂SO₄, 50 grams | 33 | 80 |

In Example 18, the reaction was carried out with 300 g. methylamine instead of ammonia. The various types of refined steel (VA steel) which may be used as autoclave material are described in Hollemann-Wiberg Lehrbuch der anorganischen Chemie, 1952.

EXAMPLE 22

1 kg. of 2-methylene-propane-1,3-diol-diacetate is introduced dropwise in the course of 10 hours into a vertical quartz tube which has a diameter of 5.5 cm. and which is filled to a height of 60 cm. with granules of annealed aluminium oxide (acid). At the same time, 90 to 110 l. of ammonia (4 to 5 mol) per hour are passed through the tube. Temperature of the packing 350° C.

200 cc. of benzene are added to the diphasic reaction mixture and the aqueous phase is saturated with sodium chloride.

72 g. of 3,5-dimethylpyridine are obtained after distilling the organic phase twice. Yield 23%.

EXAMPLE 23

The procedure is the same as in Example 22 but is carried out at 450° C. and the rate at which 2-methylene-propane-1,3-diol-diacetate is dripped through the tube is 50 g. per hour while the rate of flow of ammonia is 40 litres per hour. Working up the reaction mixture in the receiver yields 77 g. (25% of the theory) of 3,5-dimethylpyridine.

EXAMPLE 24

The procedure is the same as in Example 22 but 500 g. of 2-methylene-propane-1,3-diol is used and the rate at which it is dripped through the tube is 100 g./hour. The rate of flow of ammonia is 60 l./h. and the temperature of the filling in the tube is 400° C. to 430° C. Working up the reaction mixture in the receiver yields 112 g. of 3,5-dimethylpyridine. Yield 36% of the theory.

EXAMPLE 25

The procedure is the same as in Example 22 but the reaction is carried out at 500° C. to 550° C. 41% of the theoretical yield of 3,5-dimethylpyridine are obtained under otherwise the same conditions.

Patent claims:
1. Process for preparing 3,5-dimethylpyridine which comprises reacting at a temperature in the range of 180° C. to 600° C.
   (a) a first compound selected from the group of 2-methylene-propane-1,3-diol, the mono and diesters thereof and mixtures of the foregoing,
   (b) with at least half the equimolar quantity of a second compound selected from the group of ammonia, methylamine, dimethylamine and mixtures of the foregoing,
   (c) in the presence of an acid catalyst selected from the group consisting of mineral acids, arsenic acid, ammonium chloride, benzene sulphonic acid, o-aminobenzenesulphonic acid, picric acid, naphthalenesulphonic acid, o-nitrobenzoic acid, lactic acid, acetic acid, trichlorophenol, oxalic acid, succinic acid, methanesulphonic acid, ethanesulphonic acid, propanesulphonic acid, butane sulphonic acid, p-toluenesulphonic acid, solid acid catalysts selected from the group consisting of aluminum oxide, silicic acid and boron phosphate, and the ammonium, methylamine and dimethylamine salts of the foregoing.

2. Process of claim 1 carried out in the presence of a polar solvent.

3. Process of claim 1 carried out at elevated pressure.

4. Process of claim 1 wherein 2-methylene-propane-1,3-diol-acetate or 2-methylene-propane-1,3-diol-monoacetate is used.

5. Process of claim 4 wherein a solid acid catalyst is used.

6. Process of claim 1 wherein crude 2-methylene-propane-1,3-diol prepared from 2-methylene-propane-1,3-diol-diacetate by alcoholysis and containing 1 to 30% of monoacetate and/or diacetate is used.

7. Process of claim 1 wherein the reaction is carried out in the presence of water and/or methanol at a temperature of about 300° C. and a pressure of 30 to 200 excess atmospheres.

8. Process of claim 1 wherein said catalyst is used in an amount of 0.1 to 20% by weight based on the reactants.

9. Process of claim 1 wherein 2-methylene-propane-1,3-diol and ammonia are reacted at a pressure of 10 to 200 excess atmospheres and a temperature of from 200° to 300° C.

10. Process of claim 1 wherein the quantity of the second compound is 0.5 to 10 mols per mol of said first compound.

References Cited

UNITED STATES PATENTS 2,010,076   8/1935   Groll et al. _____ 260—603 R

FOREIGN PATENTS 654,443   6/1951   Great Britain _____ 260—290

OTHER REFERENCES

Hine, Physical Organic Chemistry, 2nd ed., p. 280 (1962).

HARRY I. MOATZ, Primary Examiner